UNITED STATES PATENT OFFICE.

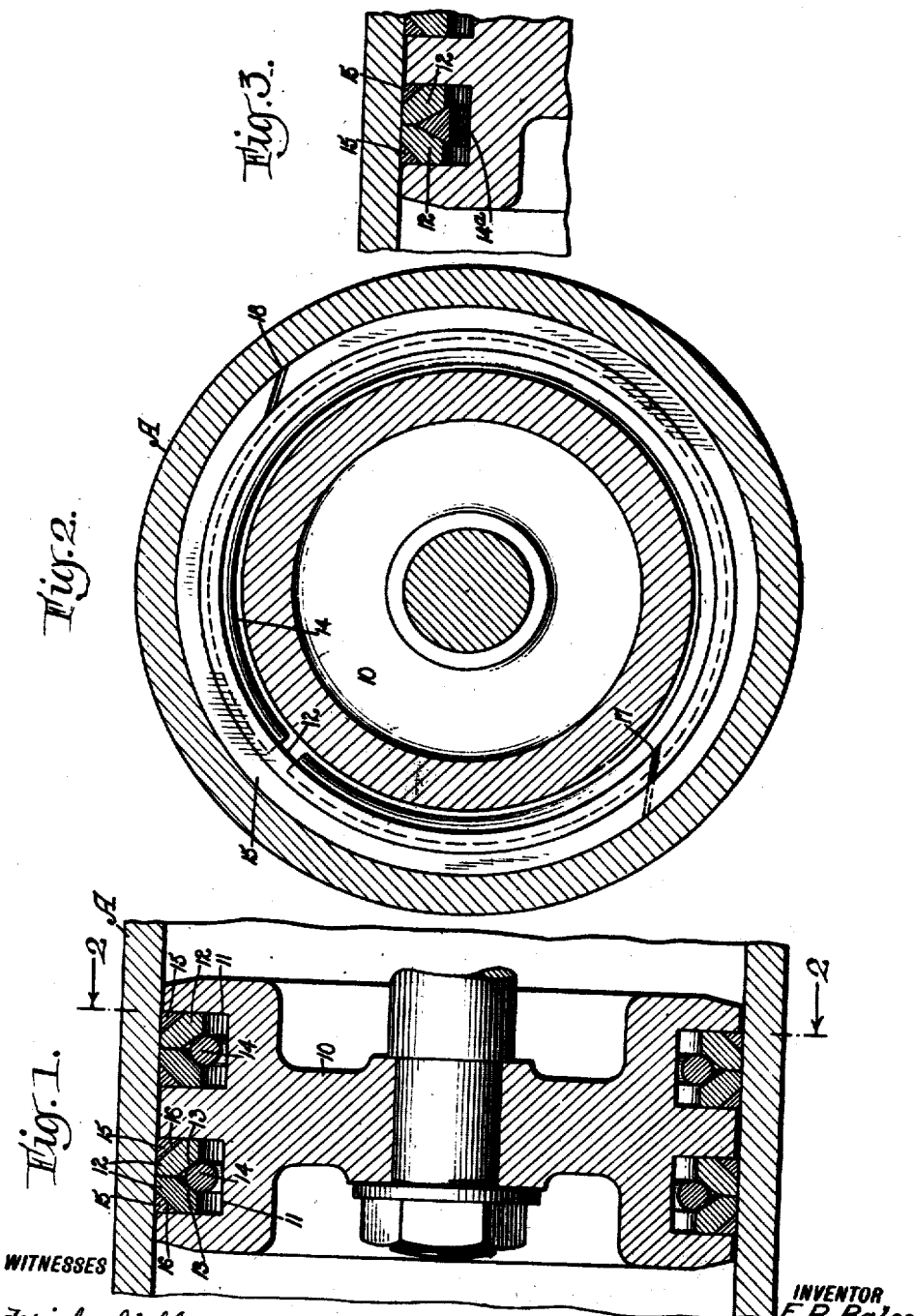

EDWARD R. BALES, OF CENTRALIA, ILLINOIS.

PISTON PACKING-RING.

1,267,169.  Specification of Letters Patent.  Patented May 21, 1918.

Application filed May 9, 1917. Serial No. 167,410.

*To all whom it may concern:*

Be it known that I, EDWARD R. BALES, a citizen of the United States, and a resident of Centralia, in the county of Marion and State of Illinois, have invented a new and Improved Piston Packing-Ring, of which the following is a full, clear, and exact description.

The invention relates to packing rings adapted to be employed on the pistons of various engines or machines, but is more particularly designed for use on the pistons of locomotive power-reversing gears, air-brake triple-valve pistons, and other devices in which the movements of the piston must be controlled by very small differences of pressure on the respective sides thereof. Piston packing-rings in common use, as is well known, are forced against one side of the groove in the piston and thereby prevent leakage around the packing ring of the steam entering the groove at the high pressure side of the ring, by sealing the ring against the opposite side or lower pressure side of the groove, this action taking place if the pressure is sufficient to overcome the friction of the face of the ring against the cylinder walls, and then only one side of the ring acts to prevent leakage. When the piston must be controlled by a very small difference of pressure on either side of the piston, there is sometimes a considerable leakage around the packing ring through the groove.

The prime object of my invention is to provide packing rings and expanding means therefor so correlated as to cause the expanding means to exert a pressure against the packing rings in a direction to expand the packing rings obliquely, whereby to force the same against the cylinder walls and simultaneously force them laterally against the opposite side walls of the groove, thereby effectually preventing fluid pressure from entering between that side of the groove and side of the ring nearest the high pressure, or from leaving between the ring and the side of the groove nearest the lower pressure. The stated object is attained by employing a pair of packing rings presenting opposite beveled surfaces at their inner corners and an expanding ring exerting a wedging action on the packing rings at said surfaces to force the packing rings obliquely outward. Advantageously, each packing ring of a pair may be formed of an inner and outer split ring having contacting beveled surfaces, the inner and outer rings breaking joint.

The nature of the invention and its advantages will more clearly appear as the description proceeds.

Reference is to be had to the accompanying drawings forming a part of this specification in which similar reference characters indicate corresponding parts in all the views.

Figure 1 is a longitudinal vertical section of a piston packing embodying my invention, showing the same in connection with a piston and a portion of a cylinder;

Fig. 2 is a transverse vertical section on the line 2—2, Fig. 1;

Fig. 3 is a fragmentary longitudinal vertical section showing the same form of packing rings as in Fig. 1, but a modified form of the expanding ring.

The numeral 10 indicates a piston of known form having in the illustrated example a pair of annular grooves 11 to receive the packing for effecting a tight joint between the piston and the walls of the cylinder A or other chamber.

Inasmuch as the packing elements and their appurtenances in each groove 11 are the same, it will suffice to particularly refer to one, it being understood that one set may be employed or several, as desired. In each groove 11 a pair of split packing rings 12 is arranged adjacent to each other and at the inner adjacent corners thereon, opposed beveled surfaces 13 are produced converging outwardly. An expanding split ring 14 is disposed within the pair of rings 12 and having such a cross section as to exert a wedging action against the surfaces 13 of the packing rings. In the form shown in Figs. 1 and 2, the expanding ring 14 is of round cross section, while in Fig. 3 I have indicated at 14ᵃ an expanding ring triangular in cross section. As the other elements shown in Fig. 3 are identical with the corresponding parts in Fig. 1, the same identifying reference characters are employed.

With the described arrangement it will be clear that the expansive force of the ring 14, due to the wedging action of said ring against the surfaces 13, will cause the rings 12 to expand obliquely, thus simultaneously moving them into fluid-tight engagement with the cylinder A and with the opposite side walls of the grooves 11. Thus one ring 12 will effectually seal the high pressure side of the packing and the companion ring will seal the low pressure side, thereby overcoming the defect of the common form in which the steam pressure forces the ring away from the high pressure side of the groove in pressing the ring against the low pressure side.

In order to prevent leakage between the meeting edges of the respective rings 12, I provide in connection with each of said rings, a second smaller packing ring 15 disposed at that outer corner of the said ring 12 opposite the beveled surface 13 thereof. The rings 15 are triangular in cross section so that the contacting surface between said ring and the ring 12 to which it pertains will be disposed obliquely as the rings are viewed in cross section. It will be observed from Fig. 2 that a ring 15 breaks joint with its associated ring 12, the splits 17, 18 thereof being positioned approximately 180° apart or otherwise separated a proper distance.

It is to be noted that the rings 12 extend radially outward between the rings 15 to present peripheries lying in the same cylindrical surface with the said rings 15 whereby to contact jointly with said rings 15 against the cylinder.

I wish to state in conclusion that although the illustrated examples constitute practical means of carrying my invention into effect, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A piston packing including a pair of separate expansible split packing rings presenting opposed convergent surfaces at their adjacent inner corners and having beveled surfaces at the opposite outer corners, additional split rings outside the first rings at the said outer corners thereof and having corresponding beveled inner surfaces, the first mentioned rings extending between the second mentioned rings to present peripheries lying in the same cylindrical surface with the second mentioned rings, and a resilient expanding ring acting interiorly on the first rings at the converging surfaces thereof to expand the packing rings obliquely.

2. A piston packing including main expansible split packing rings, an auxiliary split packing ring associated with said main rings at the outer side thereof, the respective main and auxiliary rings having obliquely disposed contacting faces and presenting peripheries in the same cylindrical surface, and resilient expanding means acting on said main rings at the interior and exerting pressure thereon to expand the same obliquely, said main and auxiliary rings breaking joint.

EDWARD R. BALES.